United States Patent [19]

Murakami

[11] Patent Number: 4,607,290
[45] Date of Patent: Aug. 19, 1986

[54] IMAGE INFORMATION FILING APPARATUS

[75] Inventor: Hiroyasu Murakami, Yokohama, Japan

[73] Assignee: Kabushiki Kaisha Toshiba, Kawasaki, Japan

[21] Appl. No.: 618,350

[22] Filed: Jun. 7, 1984

[30] Foreign Application Priority Data

Jun. 10, 1983 [JP] Japan .................. 58-103663

[51] Int. Cl.⁴ .................................. H04N 1/00
[52] U.S. Cl. ........................... 358/260; 358/263; 371/37; 369/124
[58] Field of Search .......... 358/256, 260, 263, 296; 371/37; 369/124; 360/8, 9.1, 11.1, 33.1

[56] References Cited

U.S. PATENT DOCUMENTS

| | | | |
|---|---|---|---|
| 4,044,382 | 8/1977 | Yagishita | 358/260 |
| 4,270,148 | 5/1981 | Adachi | 358/260 |
| 4,312,069 | 1/1982 | Goss et al. | 371/37 |
| 4,386,373 | 5/1983 | Kondo et al. | 358/260 |
| 4,409,623 | 10/1983 | Kobayashi et al. | 358/260 |
| 4,468,769 | 8/1984 | Koga | 371/37 |
| 4,498,107 | 2/1985 | Yoshimura et al. | 358/256 |
| 4,500,926 | 2/1985 | Yoshimura | 358/256 |

Primary Examiner—James J. Groody
Assistant Examiner—John K. Peng
Attorney, Agent, or Firm—Cushman, Darby & Cushman

[57] ABSTRACT

An image information filing apparatus includes a data compressing circuit for compressing line image information corresponding to each scanning line to decrease the redundancy of the image information and a circuit section for adding line sync code and EOL and CRC codes to the head and end of the line image information, respectively. When the line sync code is MFM-modulated together with the line image information, one pulse is removed from the modulated pulses corresponding to the line sync code. The line image information are separated from each other by the detection of the line sync code with the missing pulse.

9 Claims, 18 Drawing Figures

IMAGE INFORMATION FILING APPARATUS

BACKGROUND OF THE INVENTION

This invention relates to an image information filing apparatus in which documents are recorded as image information on optical disks.

Recently, image information recording apparatus which record and reproduce great amounts of document data as image information have become extensively utilized. In such image information recording apparatus, documents are optically scanned and read out as image information. The read-out image information is recorded on an optical disk. At this time, retrieval data pertaining to the image information is also recorded on a recording medium, e.g., a floppy disk. When reproducing image information, a code corresponding to the retrieval data is keyed in. The retrieval data is thus searched from the floppy disk, and according to this floppy retrieval data the relevant image information is read out from the optical disk and displayed on a CRT display or printed out by a printer to produce a hard copy.

When image information is recorded on an optical disk in such information filing apparatus, it is usually data compressed for each scanning line by a MF (modified Hoffman) coding method or MR (modified Reader) coding method before it is recorded on the optical disk. In most cases, the quantity or length of compressed data varies for each scanning line. That is, data lines of different lengths are continuously arranged. For this reason, it is difficult to separate the data lines from each other.

SUMMARY OF THE INVENTION

The present invention has an object of providing an image information filing apparatus, which permits reliable separation of image information into individual lines and also permits ready correction of coding deviation or bit deviation.

According to the invention, an image information filing apparatus comprises a document scanner for scanning a document to produce an image information corresponding to the document pattern, a redundancy processing circuit for processing the image information every one scanning line to decrease the redundancy of the image information and produce line image information of different lengths, a code generating circuit for generating EOL (End Of Line) code and CRC (Cyclic Redundancy Checking) code, a code adding circuit for adding the EOL and CRC codes to the end of each line image information from the information redundancy processing circuit to produce a line data, a page buffer for storing line data corresponding to one page, a line sync code generator for generating a line sync code having components repeated in constant and specific components, a circuit for reading out sequentially the line data from the page buffer and adding the line sync code to each line data, a modulator for modulating the line data added with the line sync code, and an optical disk device for recording sequentially the modulated line data on the track of the optical disk.

DETAILED DESCRIPTION OF THE PREFERRED EMBODIMENT

Figure 1:
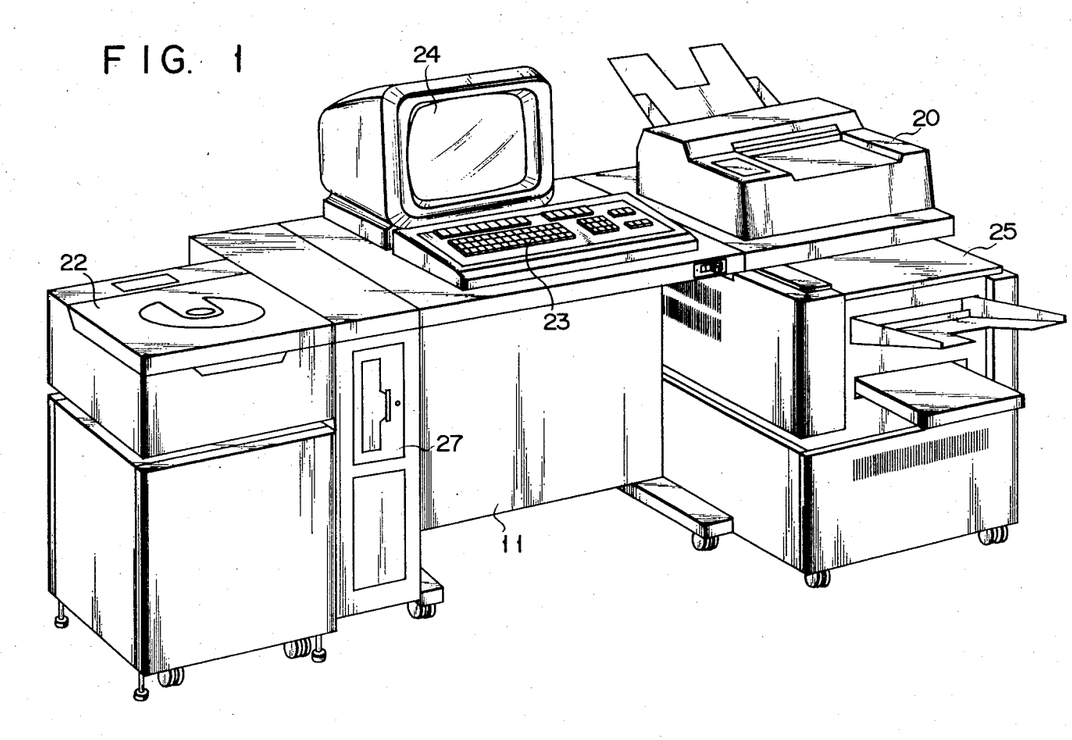
FIG. 1 is a perspective view showing an image information filing apparatus according to the invention.

Referring to FIG. 1, there is shown an image information filing apparatus, which comprises a control console 11 which constitutes a main control section, a scanner unit 20, an optical disk unit 22, a keyboard 23, a display device 24, a printer 25 and a floppy disk unit 27. As shown in the block circuit diagram of FIG. 2, the scanner unit 20, optical disk unit 22, display device 24, printer 25 and floppy disk unit 27 are connected to a CPU 12 in the control console 11 via a control bus and data bus. The control console 11 includes a main memory 13, a page buffer 14, a data coding/decoding circuit 15, a character patttern generator 16, a display interface 17 and a title memory 18, these components being also connected to the CPU 12 via the control bus and data bus. The page buffer 14 has a memory capacity of storing image information corresponding to scanning lines covering one page of at least A4 size document, e.g., 2,304 lines. The data coding/decoding (data compressing/expanding) circuit 15 has functions of coding for reducing the data redundancy and decoding of coded data into original data. The pattern generator 16 generates pattern data of characters or marks. The floppy disk 28 stores retrieval data. The scanner unit 20 scans a document two-dimensionally with a laser beam and provides image information. The optical disk device 22 is constructed such that it can optically record image information obtained from the scanner unit 20 on the optical disk 19 and also optically read out the recorded information from the disk.

Figure 3:
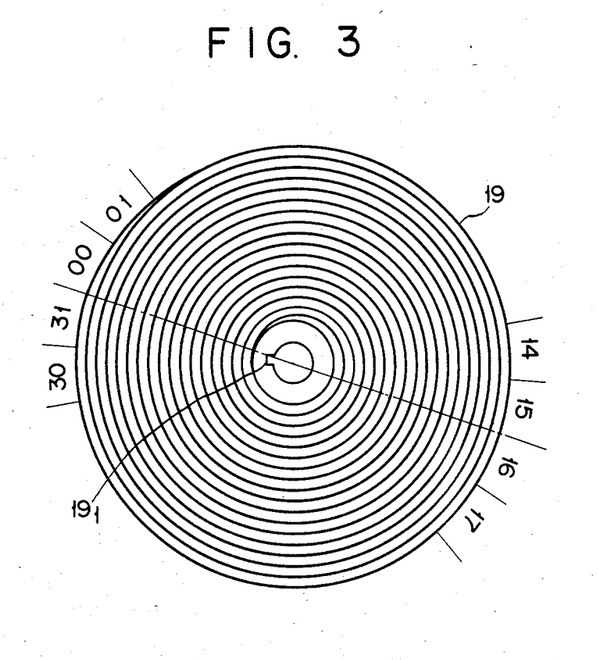
FIG. 3 is a plan view showing an optical disk.

FIG. 3 shows the optical disk 19. It comprises a circular base made of glass or plastics and a doughnut-like coating of a thin film of such metal as bismuth or tellurium provided on the surface of the base. It has a reference position mark $19_1$ which is constituted by a notch formed in a central portion of the metal film coating. It is divided into 32 sectors 00 to 31 with respect to the reference position mark $19_1$ as point 0. It has a spiral groove formed in its recording area. The individual turns of the spiral groove are given track numbers from the innermost turn.

Figure 2:
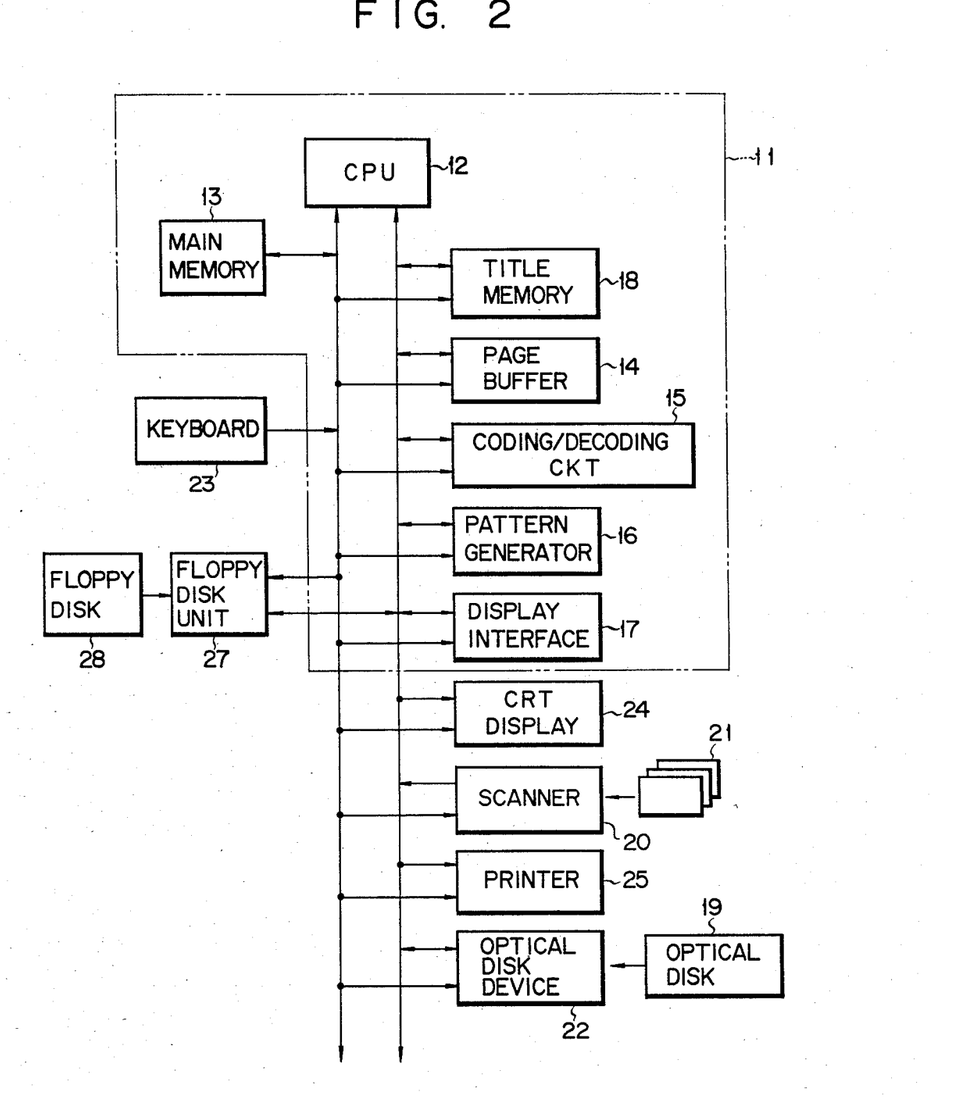
FIG. 2 is a block circuit diagram of the image information filing apparatus shown in FIG. 2.

The keyboard 23 is operable for coupling search codes for image information and various operation commands. The display device is a cathode-ray tube (CRT) constituting an output display section. It can display image information read out by two-dimensional scanner 20 and supplied through main console 11 and image information read out from optical disk unit 22 and supplied through main console 11. It displays image information in an interlocked relation to the display interface 17 in the main console 11.

The printer 25 produces hard copy of the image information read out by the two-dimensional scanner and supplied through the main console 11 or retrieval data or image information read out from the optical disk unit 22 and supplied through the main console 11. The floppy disk unit 27 stores retrieval data in the floppy disk 28.

Figure 4:
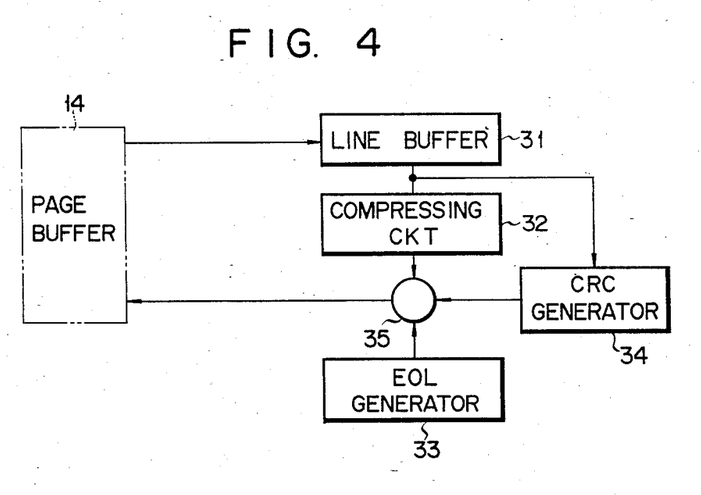
FIG. 4 is a block diagram showing a data compression circuit section.
Figure 5:
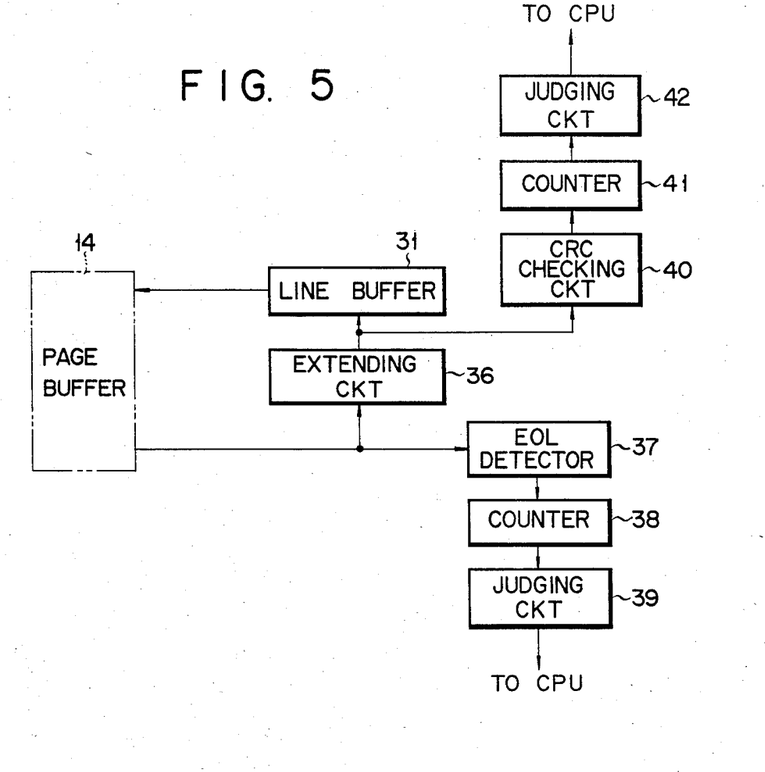
FIG. 5 is a block circuit diagram showing a data expansion circuit section.

The data coding/decoding circuit 15 has a construction as shown in FIGS. 4 and 5. FIG. 4 shows its operative components at the time of coding (or compressing), including a line buffer 31 for one scanning line (specifically a 1,728-bit buffer memory), a MH or MR coding circuit 32, a second special code generator (or EOL generator) 33 which generates a second special code or end-of line-code (hereinafter referred to as EOL), a CRC generator 34 which generates cycle redundancy checking code (hereinafter referred to as CRC) for one scanning line of image information, and an EOL/CRC adder 35 which adds EOL and CRC noted above to the end of one scanning line of coded image information. FIG. 5 shows the components of the data coding/decoding circuit 15 at the time of decoding (or expanding), including a MH or MR decoding circuit 36, EOL detector 37 which detects EOL added to the coded image information, a counter 38 for counting the results of detection by the EOL detector 37, a checking circuit 39 which checks whether the number of coded image information lines has reached a predetermined number (e.g., 2,297 lines) from the count of the counter 38, CRC checking circuit 40 which checks cycle redundancy form the CRC added to the coded image information and decoded image information for one scanning line, a counter 41 for counting errors due to the check by the CRC checking circuit 40, and a checking circuit 42 which checks whether the number of error lines is less than a predetermined number (e.g., 64 lines) from the count of the counter 41.

Figure 6:
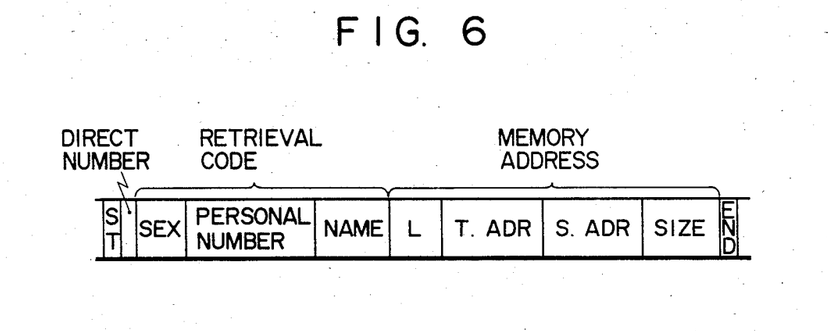
FIG. 6 is a view showing the format of retrieval data.

FIG. 6 shows the format of retrieval data. It has a total of 25 digits, with 20 digits constituting a retrieval code, which is divided into 6 items at the most, and 5 digits constituting address data. The address data is assembled by a one-digit image information length (or sector number) data L, a two-digit image information recording track address (or track number) data T.ADR, a two-digit image information recording sector address data S.ADR and one-digit size data.

Figure 7:
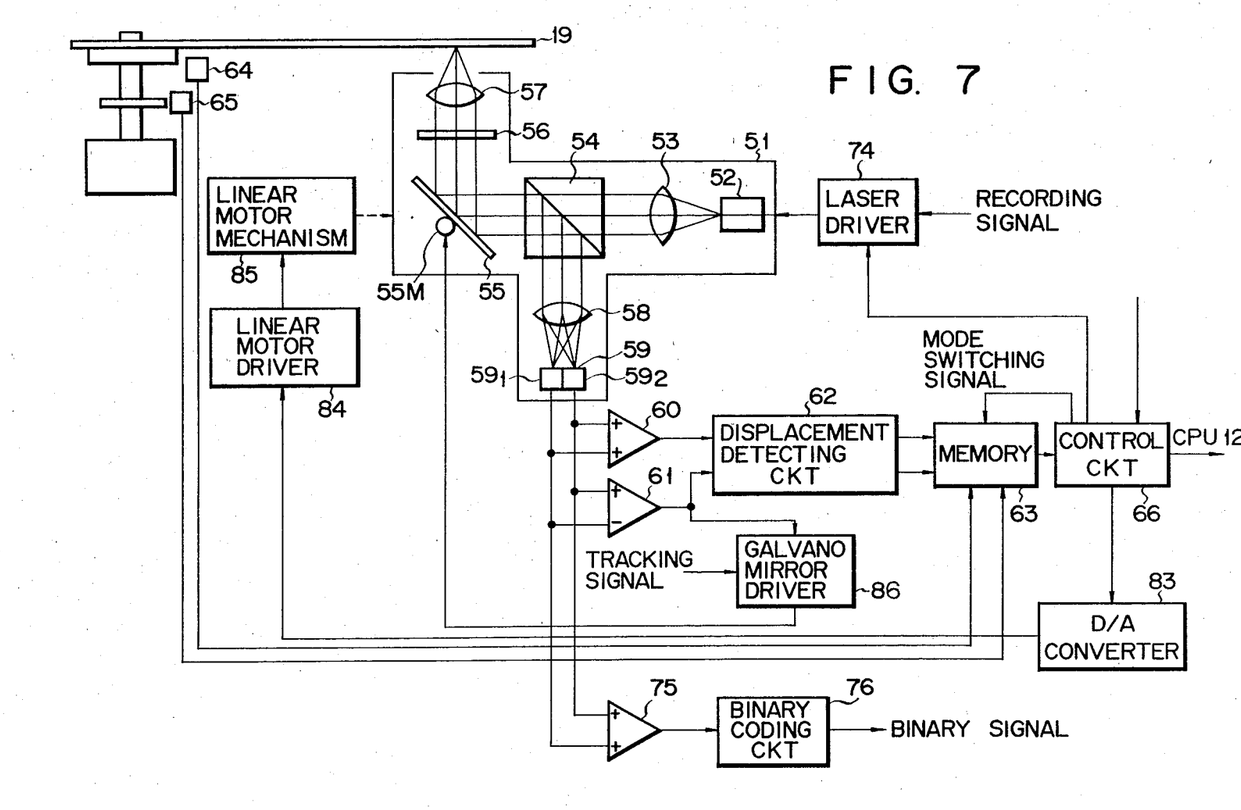
FIG. 7 is a block circuit diagram showing an optical disk unit shown in FIGS. 1 and 2.
Figure 8:
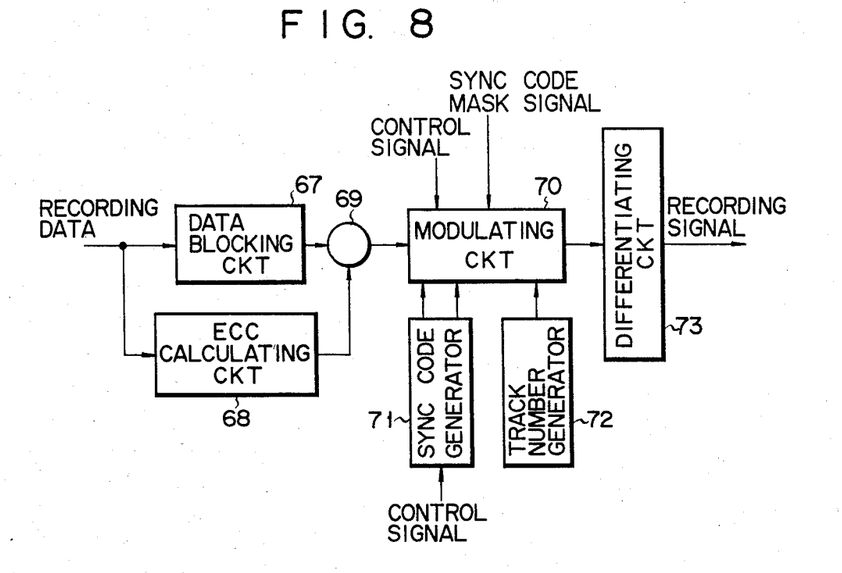
FIG. 8 is a circuit diagram showing a control circuit shown in FIG. 7.
Figure 9:
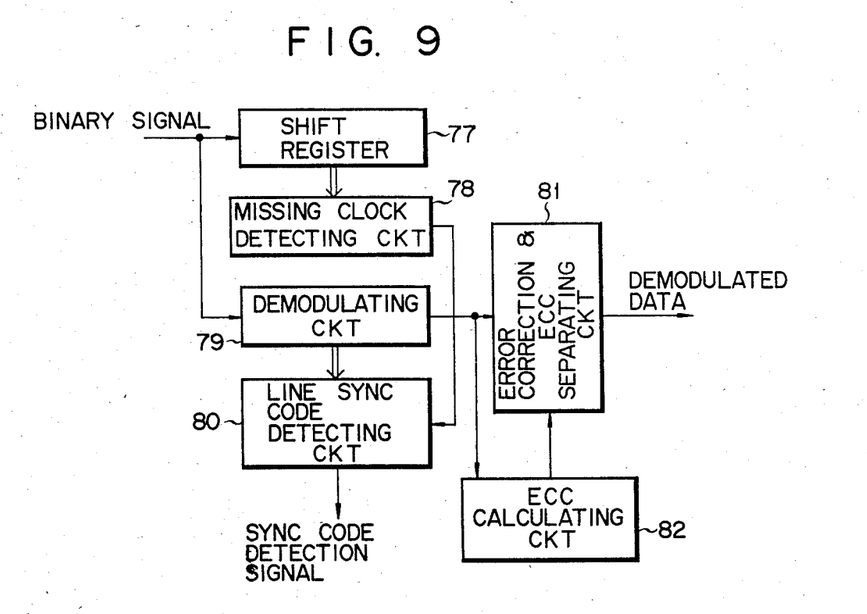
FIG. 9 is a block circuit diagram showing a demodulating circuit section.

The optical disk unit 22 will now be described in detail with reference to FIGS. 7 through 9. An optical head 51 is provided for movement along the back side of the optical disk 19 in the radial direction thereof for recording and reproduction of data. The optical head 51 includes a semiconductor laser oscillator 52 which generates a laser beam, a collinating lens 53, a beam splitter 54, a galvano-mirror 55, a λ/4 plate 56, an objective lens 57, a convex lens 58 and a two-element photosensor 59 having two photoelectric elements $59_1$ and $59_2$ which photoelectrically convert reflected light from the optical disk 19. The outputs of the photoelectric elements $59_1$ and $59_2$ are fed to respective adders 60 and 75. Also, they are fed to a differential amplifier 61. The output of the adder 60 and the output of the differential amplifier (which is a positional deviation signal) are fed to a displacement detecting circuit 62. The displacement detecting circuit 62 detects the amount of displacement i.e. the signal corresponding to a track (or groove) across the optical disk 19 and the crossing direction according to the outputs of the adder 60 and differential amplifier 61.

The output of the displacement detecting circuit 62 is fed to a memory 63. To the memory 63 are fed the outputs of a reference position detector 64 and a position detector 65 and also a mode switching signal from a control circuit (e.g. CPU) 66. The memory 63 stores the amount of displacement (or displacement correction data), i.e., signal corresponding to the crossing track (or groove) and the crossing direction for each of the 32 sectors obtained by dividing between two consequtive reference position detection signals into 32 sections in response to the detection signal from the position detector 65. In the recording and reproducing modes, the memory 63 provides the stored displacement correction data in synchronism to the detection singal from the position detector 65.

The output of the adder 75 is fed to a binary circuit 76, which in turn feeds a binary signal to a shift register 77. The shift register 77 has an 8-bit structure to store the input binary signal. The data stored in the shift register 77 is fed to a missing clock detecting circuit 78. The missing clock detecting circuit 78 detects a missing clock from the data of the shift register 77 to descriminate error modulated image information from correct modulated image information. It feeds the result data to a line sync code detecting circuit 80. The binary signal from the binary circuit 76 is also fed to a demodulating circuit 79, which modulates the input binary signal by modified-frequency modulation (MFM). The output of the circuit 79 is fed to the line sync code detecting circuit 80, an error correcting/ECC separating circuit 81 and an ECC calculating circuit 82. When the singal provided from the demodulating circuit 79 is a line sync code (which is a special code) while the missing clock detecting circuit 78 is not providing any detection signal, the line sync code detecting circuit 80 detects the line sync code as such and feeds it to the control circuit 66.

The ECC calculating circuit 82 calculates ECC from the input demodulation data and feeds the result of calculation to the error correcting/ECC separating circuit 81. The error correcting/ECC separating circuit 81 corrects error of each block of the demodulation data and sepatates ECC. Its output, i.e., demodulation data, is fed through the control cirucit 66 to the page buffer 14.

The output of the memory 63 is fed to the control circuit 66. The control circuit 66 controls entirely the optical disk unit 22 according to a signal from the CPU 12. For example, it controls a linear motor driver 84 by supplying the output signal of the memory 63 through a D/A converter 83 to the linear motor driver 84.

The linear motor driver 84 drives a linear motor mechanism 85 to move the optical head 51 according to the input signal so that the light beam from the optical head 51 always follows a predetermined track. The linear motor mechanism 85 moves the optical head 51 in the radial direction of the optical disk 19.

The output of the differential amplifier 61 is fed to a galvano-mirror driver 86. The galvano-mirror driver 86 drives a driving coil 55M of the galvano-mirror 55 to cause rotation of the galvano-mirror according to the positional deviation signal from the differential amplifier 61. The positional deviation is detected accurately according to the differential amplifier output, and the galvano-mirror effects tracking according to the positional deviation signal. At this time, the amount of displacement that has not been corrected by the linear motor mechanism 85 operating according to the displacement correction data, is corrected by the tracking by the galvano-mirror.

The control circuit 66 also has a function of supplying recording data from the page buffer 14 to data block forming circuit 67 and ECC calculating circuit 68. The data block forming circuit 67 feeds the input recording data as block data every 4 bytes to an ECC adding circuit 69. The ECC calculating circuit 68 calculates ECC (error correcting code) for one byte of the block data and feeds the result of calculation to the ECC adding circuit 69. The ECC adding circuit 69 adds ECC to block data fed to a modulating circuit 70. The modulating circuit 70 modified-frequency-modulates the input block data (i.e., recording data of image information). The modulating circuit 70 modulates the first special code, i.e., line sync code, from the first special code generator (i.e., line sync code generator) 71 according to sync code mask signal and missing clock provided from the control circuit 66 and also modulates the track number data (i.e., access address data) from track number generating circuit 72. The line sync code and track number data are added to the head of block data for one line.

The modulating circuit 70 also addes preamble data and postamble data of a constant duration to the respective leading and trailing ends of recording data for one line.

The output of the modulating circuit 70 is fed to a differentiating circuit 73. The differentiating circuit 73 differentiates the input MFM data and provides a recording singal at every data switching timing.

The output singal of the differentiating circuit 73 is fed to a laser driver 74. The laser driver 74 drives the laser oscillator 52 according to the input data.

Figure 10:
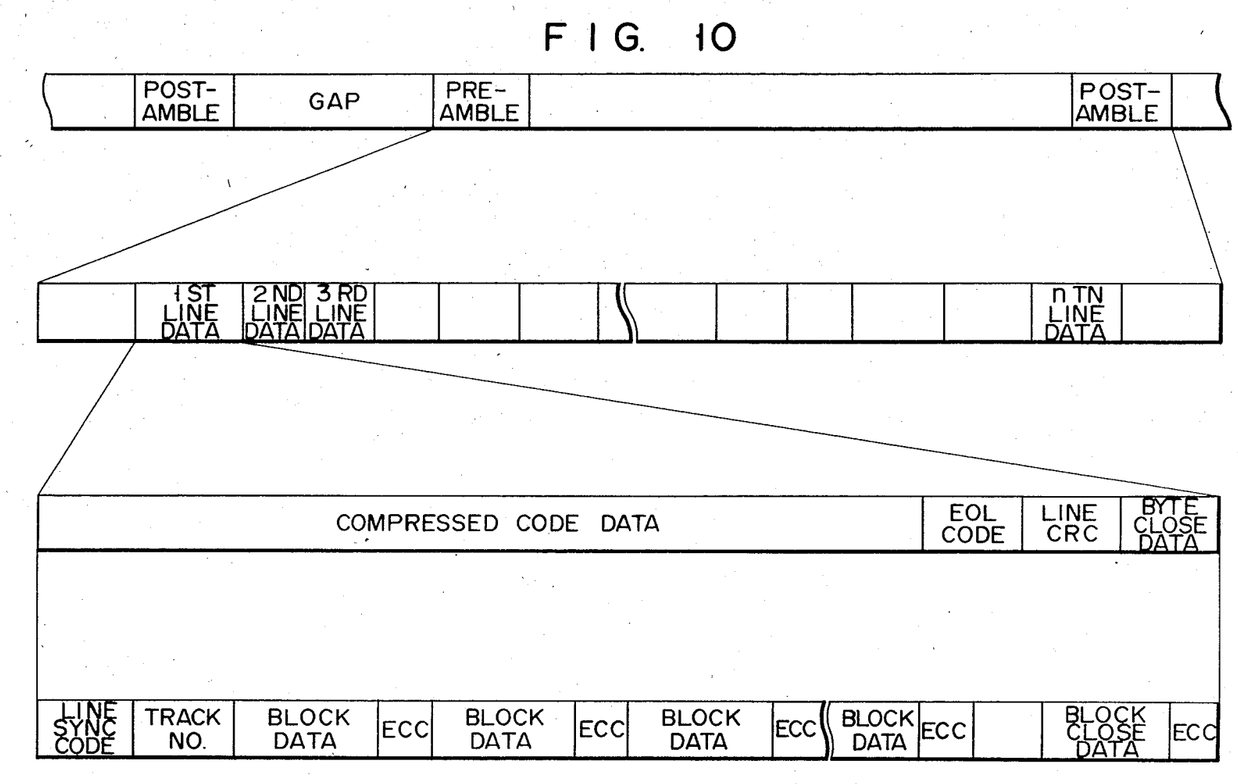
FIG. 10 is a view showing the format of image information for one scanning line.
Figure 11:
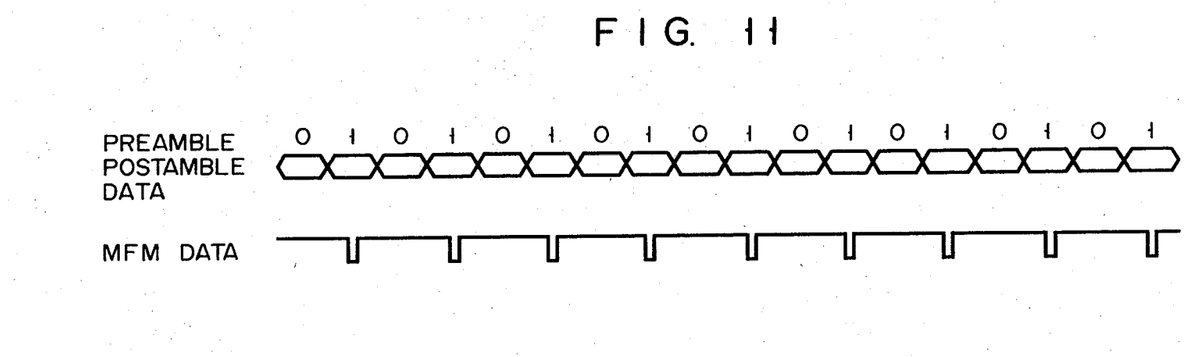
FIG. 11 is a view showing preamble and postamble data and MFM data.

FIG. 10 shows a format, with which image information is recorded along the track groove of the optical disk 19. A gap more than an interval corresponding to at least one sector is provided between adjacent line image information for the purpose of the separation of line image information. The preamble data data and postamble data are provided at the leading and trailing ends of each line image information, i.e., image information is recorded between the preamble and postamble data. As the preamble and postamble data, data "010101010101010101" as shown in FIG. 11, for instance, is recorded after MFM modulation on the optical disk.

The image information is constructed of a number of line information which is determined by the size of the input image and also by the resolution of the two-dimensional scanner 20. Each line data includes compressed data, EOL code, CRC code and byte close data. The byte close data serves to fill remaining bits that may occur in one byte having 8 bits. Each line data consists of 4-byte block data. A one-byte ECC code is inserted for each 4-byte block. Further, line sync code and track number code are inserted in the head.

Figure 12:
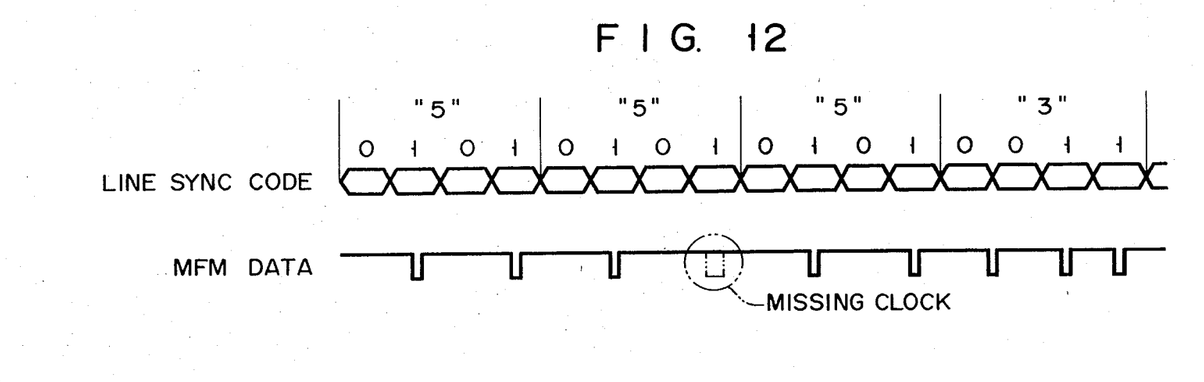
FIG. 12 is a view showing line sync code and MFM data.
Figure 13:
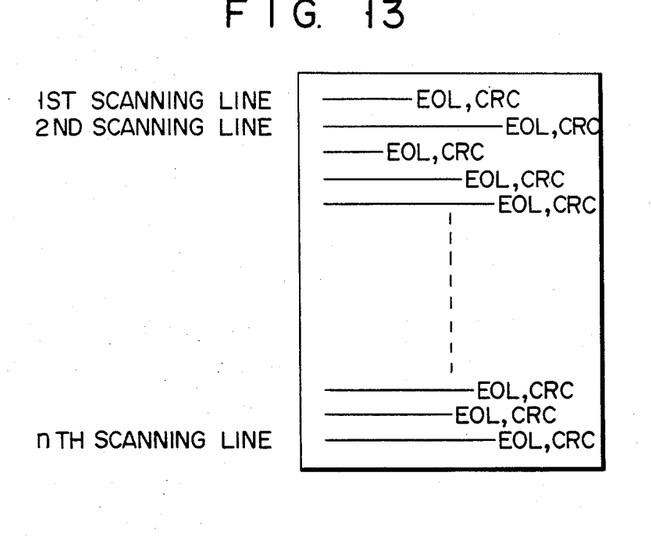
FIG. 13 is a view showing a MH-coded image information pattern.

The line sync code is a 2-byte data of "5553" in hexadecimal expression as shown in FIG. 12. When this data is modified-frequency-modulated, MFM data which is a result of removal of one of MFM modulation pulses, is recorded on the disk. The removed pulse is referred to as missing clock, which does not occur in data other than the line sync code so that it is utilized for preventing the erroneous detection of line sync code. The track number code consists of 2-byte data and one-byte track number CRC, and it is recorded subsequent to the line sync data. The track number code is thus decoded by reading 3-byte data after the detection of line sync code and checking for the CRC code in the 3-byte data. It can be decoded independently of the reading of image information, and its decoding permits highly accurate accessing of predetermined image information.

The construction having the above construction operates as follows. As preliminary operations, a power source (not shown) is turned on, an optical disk 19 without any image information recorded thereon is mounted on the optical disk unit 22, and a floppy disk 28 is inserted into the foppy disk unit 27. When a displacement memory mode is set by the keyboard 23, the CPU 12 provides a signal representing this mode to the control circuit 66 in the optical disk unit 22. Consequently, the control circuit 66 provides a predetermined signal through the D/A converter 83 to the linear motor driver 84. The linearmotor driver 84 thus drives the linear motor mechanism 85 to move the optical head 51 to a position corresponding to the innermost track. The control circuit 66 then operates the laser driver 74. The laser 52 thus provides a reproduction laser beam which is a low level laser beam. This laser beam is focused by the objective lens 57 onto the innermost track. The reflection of the reproduction laser beam by the track on the optical disk 19 is led to the photosensor 59 for photoelectric conversion to an electric signal. The output signals thus obtained from the photoelectric elements $59_1$ and $59_2$ are fed to the adder 60 and differential amplifier 61. The adder 60 provides a signal which corresponds to the sum of the two input signals, while the differential amplifier 61 provides a positional deviation singal corresponding to the difference between the two input signals. According to these signals, the displacement detecting circuit 62 detects displacement and provides signals representing direction and track. According to these signals, the memory 63 stores the displacement data in addresses that correspond to the detection signal from the reference position detector 64 and detection signal from the position detector 65. In this way, displacement correction data for each of the 32 sectors of the optical disk 19 is stored in the memory 63.

Thus, during the recording or reproduction of image information the linear motor driver 84 is operated according to the displacement correction data from the memory 63, whereby the optical head 51 is moved to a position corresponding to a predetermined track.

Figure 16:
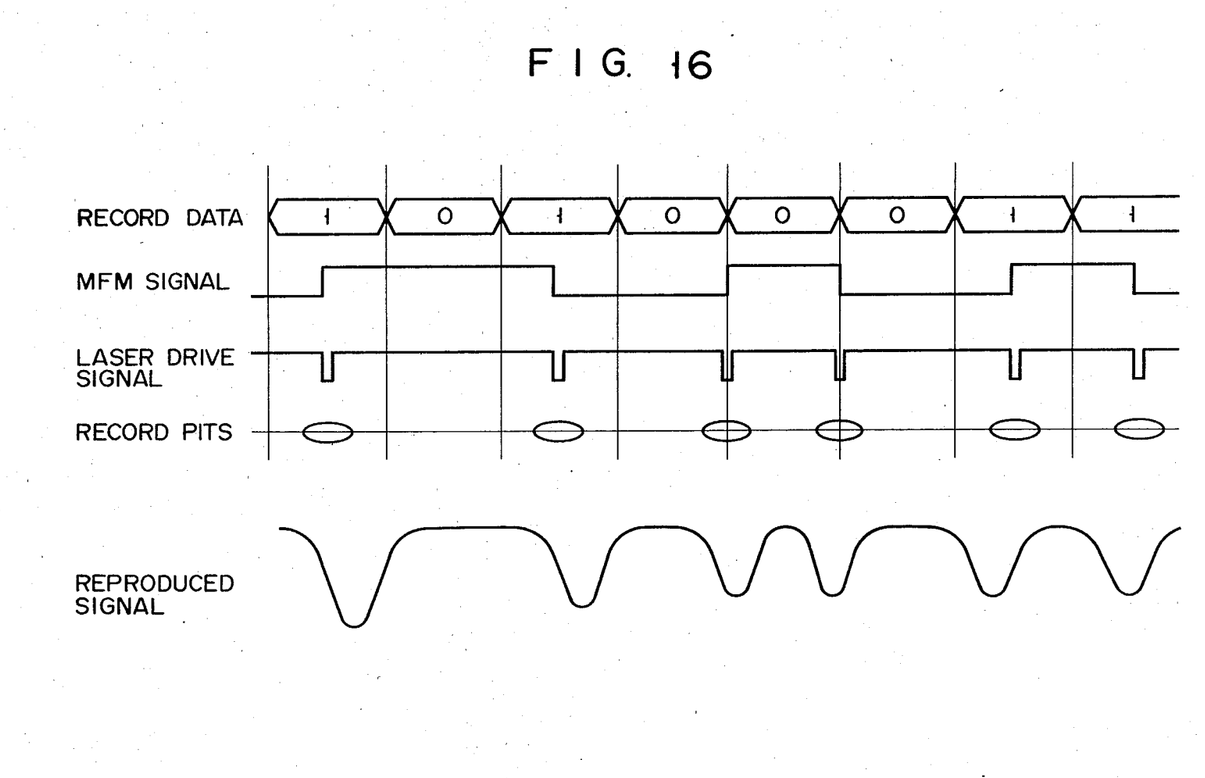

Now, recording of image information will be described. When a recording mode is set by the keyboard 23 and a retrieval code for the image information to be recorded is keyed in, the CPU 12 executes a check (cycle redundancy check and CRC) with respect to the pertinence of input data from the number of digits, kind of characters, etc. according to a predetermined retrieval code format. It also checks already recorded retrieval codes for purpose of preventing the double recording. If the retrieval code is found to be the right retrieval code as a result of these checks, it is stored in the main memory 13. In this state, a document is inserted into the two-dimensional scanner 20, and the CPU 12 operates the optical disk unit 22 and scanner 20. The scanner 20 scans the image information of the set document two-dimensionally for photoelectric conversion. Line image information obtained through the photoelectric conversion is successively stored in the page buffer 14. When image information for one page is stored in the page buffer 14, it is stored in the display interface 17 and displayed on the CRT display device 24. If the image displayed on the CRT display device 24 is satisfactory, a recording key switch (not shown) is closed. As a result, one unit of image information stored in the page buffer 14 is coded by band-compression coding in the data coding/decoding circuit 15 for each line, and each coded line image information is stored again in the page buffer 14. More specifically, the document image infomration for the first scanning line is first read out from the page buffer 14 and stored in the line buffer 31. The content of the line buffer 31 is coded by the compressing circuit 32 (FIG. 4). The coded image information is written again in the page buffer 14 from the first address of the same first scanning line area. At this time, the EOL generator 33 generates an EOL and the CRC generator 34 generates a CRC. These EOL and CRC codes are added in the EOL/CRC adding circuit 35 to the trailing end of each line of coded image information to be written therewith in the page buffer 14. The sequence of operations as described is repeatedly executed up to the last scanning line (i.e., n-th scanning line). FIG. 16 shows the relationship of signals involved in the operation described above. Thus, unit coded image information for each scanning line is obtained in the page buffer 14.

Figure 14:
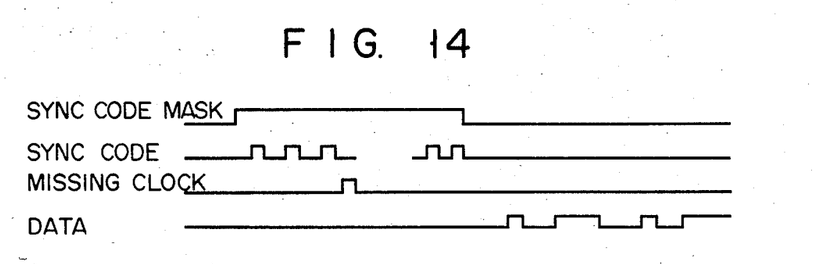
FIGS. 14 to 17 are time charts showing data and signals in a recording operation.
Figure 15:
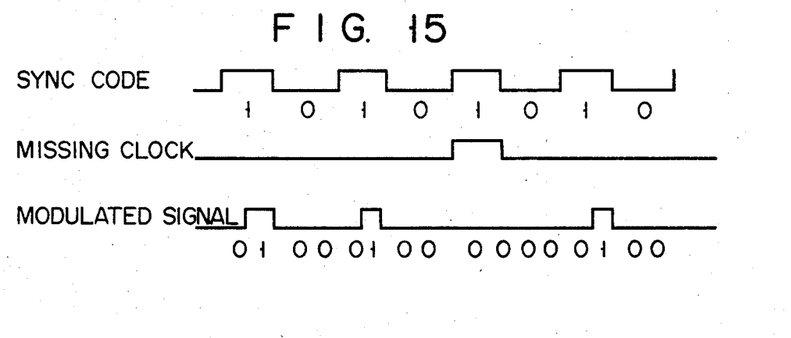

The image information for one page which is stored in the above way in the page buffer 14 is fed line by line to the optical disk unit 22. The optical disk unit 22 records the supplied image information on the optical disk 19. At this time, the linear motor driver 84 drives the linear motor mechanism 85 to drive the optical head 51. When the optical head 51 is stopped, the control circuit 66 reads out the track number of the pertinent track and provides a differential track jump pulse signal corresponding to the difference between the readout track number and the recording start track, thus causing movement of the optical head 51. When the optical head 51 is brought to a position corresponding to the recording start track, the control circuit 66 provides a control signal to the modulating circuit 70. At this time, recording data from the page buffer 14 is formed into block data every 4 bytes. The ECC calculating circuit 68 calculates the ECC of the data. The ECC adder 69 adds the ECC to each block data, and the result is fed to the modulating circuit 70. The modulating circuit 70 first modulates the postamble data bit by bit. Then it modified-frequency-modulates the line sync code from the line sync code generator 71 bit by bit according to the missing clock and line sync singal code mask singal. Then it modified-frequency-modulates the track number code from the track number generator 72 bit by bit. Then it modified-frequency-modulates recording data, EOL code and CRC code bit by bit. Then it modified-frequency-modulates the byte close data. The MFM modulated signal from the modulating circuit 70 is differentiated in the differentiating circuit 73, the output of which is fed to the laser driver 74. FIG. 14 is a timing chart showing the waveforms of signals fed to the modulating circuit 70. FIG. 15 is a timing chart showing the relation of modulated signal to missing clock.

The laser driver 74 provides a laser drive signal corresponding to the input differential signal (i.e., recording signal). According to this signal, the optical head 51 effects recording of data by forming a recording pit having a predetermined width for each laser drive signal. FIG. 16 shows various signals involved in the operation described above.

When the recording of image information is ended, the CPU 12 stores recording addresses of track numbers where image information is recorded, start sector, length of imformation, etc. in the main memory 13 in correspondence with the retrieval data. The CPU 12 then feeds the image information together with the retrieval data thereof, i.e., retrieval code, track numbers, length of information, etc. that have been stored in the main memory 13, to the floppy disk unit 27. In the floppy disk unit 27, the input retrieval data is stored on the floppy disk 28. Other image information is similarly recorded on the optical disk 19.

Now, the retrieving of image information that is recorded in the above way will be described. First, the retrieval mode is set, and a retrieval code is keyed in. As a result, the CPU 12 collates the keyed-in retrieval code to the retrieval codes stored in the floppy disk 28 successively until a search code which is coincident with the keyed-in retrieval code is found. When the coincident retrieval code is detected, the track number and start sector number of the pertaining image information are retrieved. The CPU 12 then causes the optical disk unit 22 to reproduce track on the optical disk 19 corresponding to the detected track number. More specifically, the control circuit 66 provides a signal representing the track number to the D/A converter 83. According to the track number singal, the linear motor driver 84 operates the linear motor mechanism 85 to drive the optical head 51. When the optical head 51 is stopped, the control circuit 66 reads out the track number of the corresponding track and provides a differential track number jump signal with respect to the track to be reproduced to the linear motor driver 84 to drive the optical head 51 again. At this time, a slight deviation from the sector position is produced due to deviation between the position of the laser beam from the optical head 51 and the detection position by the position detector 65.

Figure 17:
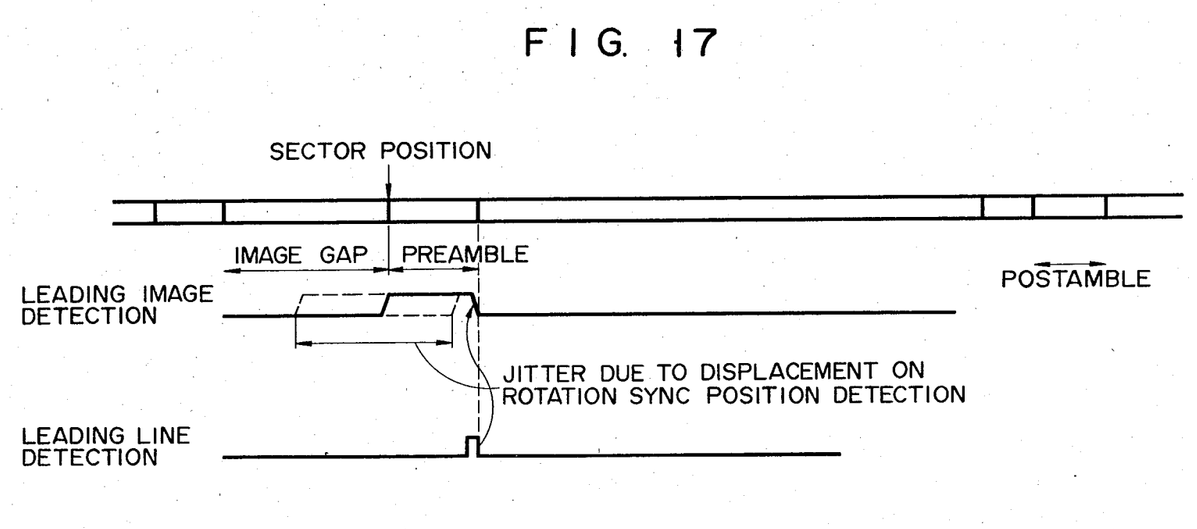

Therefore, when accessing the designated track/sector position, the control circuit 66 provides an image head detection signal, thus starting the detection of the line sync code representing the image head position. At this time, jitter is produced at the timing of appearance of the image head detection signal, such that the range of the gap between adjacent line image information and preamble data length are sufficiently covered by the jitter as shown in FIG. 17. The synchronization of the image head position is obtained by the appearance of the image head detection signal and detection of the line sync code. This is possible because the line sync detection is not done in the gap between adjacent line image information and preamble data period.

The reproduced signal from the optical head 51 is converted by the binary circuit 76 into a binary signal, which is fed to the shift register 77 and demodulating circuit 79. When the missing clock detecting circuit 78 detects that the missing clock shown in FIG. 12 has been caused by the data stored in the shift register 77, it provides a detection signal to the line sync code detecting circuit 80. The line sync code detecting circuit 80 checks whether the demodulated signal from the demodulating circuit 79 is the line sync code. If the signal is the line sync code, it provides a line sync code detection signal to the control circuit 66.

Further, the ECC calculating circuit 82 calculates the ECC of the demodulated data of the demodulating circuit 79 and feeds the result of calculation to the error correcting/ECC separating circuit 81. According to the calculation result from the ECC calculating circuit 82, the error correcting/ECC separating circuit 81 corrects error of each block of the demodulated data from the demodulating circuit 79 and separates the ECC which is fed to the control circuit 66.

Thus, when the line sync code detection signal is fed to it, the control circuit 66 reads out the signal subsequently supplied from the error correcting/ECC separating circuit 81 as track number code.

When the optical head 51 is brought to the intended track/sector position, the control circuit 66 feeds the demodulated data supplied from the error correcting-/ECC separating circuit 81 subsequent to the line sync code as data for one scanning line after another to the CPU 12. The CPU 12 thus feeds image information (i.e., coded image information) from the optical disk unit 22 for one scanning line after another to the data coding/decoding circuit 15. The data coding/decoding circuit 15 decodes the coded image information by band-expansion decoding and feeds the decoded image information to the page buffer 14. More specifically, first the coded image information for the first scanning line is MH decoded in the decoding circuit 36 and then stored in the line buffer 31. This decoding is repeatedly done until an EOL is detected by the EOL detector 37. When the EOL is detected, original image information for one scanning line is obtained in the line buffer 31. At this time, the CRC check circuit 40 effects a check of the cycle redundancy of the image information according to the MH decoded data from the decoding circuit 36 and CRC. If an error is detected, the counter 41 is incremented. The counter 41 is also incremented every time an EOL is detected. The image information for one scanning line as noted above is fed to the page buffer 14. The above sequence of operations is repreated up to the n-th scanning line. When reproduced image information for one page is all stored in the page buffer 14, the CPU 12 stores the track number code of the last track in the main memory 13. Also, it feeds the image information through the display interface 16 to the CRT display device 14 for display or feeds it to the printer 25 for producing a hard copy of the image information.

Figure 18:
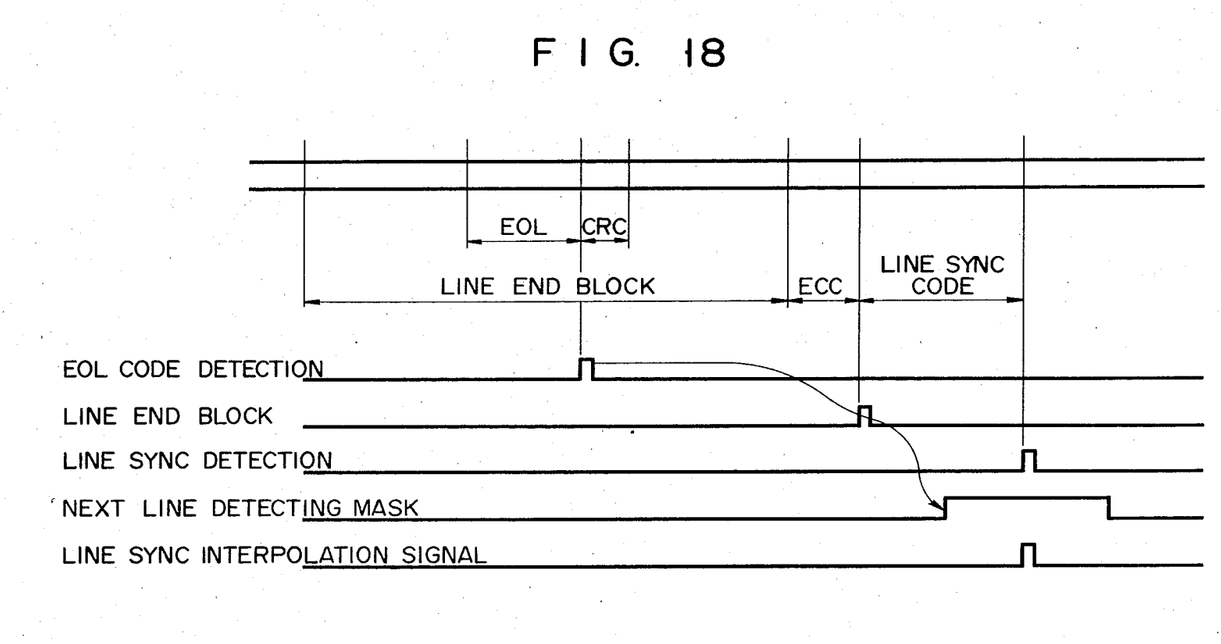
FIG. 18 is a time chart for explaining the operation of a different embodiment of the image information filing apparatus.

In the above embodiment, the image information is coded by the MF method, and an EOL code is added to the last end of each line of the coded image information. The EOL code is one which will never occur in the other data. This means that this EOL code can be utilized as line discrimination code. It is thus possible to have resort to the detection of the EOL code of the preceding line in the case of failure of detection of the line sync code for the present line. For example, upon detection of the EOL code a line end block signal is produced, and in response to this signal the next line detection mask becomes "on", as shown in FIG. 18. During the "on" state of the next line detection mask, the line sync singal for the next line is detected, and the line synchronization is taken afresh. In the event if no line sync signal is detected during the "on" state of the next line detection mask, a line sync correction singal which is determined by the timing of the EOL code detection is used as line sync singal. Further, although the means for generating and detecting the EOL and CRC have been provided in the data coding/decoding circuit, this is by no means limitative, and they may be provided in the optical disk unit as well.

As has been described in the foregoing, according to the invention it is possible to provide an image information filing apparatus, which permits correction of phase deviation of signal reproduced from information carrying medium so as to permit ready separation of image information for individual scanning lines during reproduction.

What is claimed is:

1. An image information filing apparatus comprising:
   document information scanning means for scanning a document to produce an image information corresponding to the document pattern;
   redundancy processing means for processing the image information every one scanning line to decrease the redundancy of the image information and produce line image information of different lengths;
   first code generating means for generating a first special code;
   code adding means for adding the first special code to the end of each line image information from the information redundancy processing circuit to produce a line data;
   page buffer means for storing line data corresponding to one page;
   second code generating means for generating a second special code having components repeated in constant and specific components;
   circuit means for reading out sequentially the line data from the page buffer and adding the second special code to each line data;
   means for modulating the line data added with the second special code, said modulating means comprising a MFM modulator for modified-frequency-modulating the line data and having a function for removing at least one pulse from modulated pulses corresponding to the second special code of said second code generating means; and
   optical disk means for recording sequentially the modulated line data on the track of an optical disk.

2. An image information filing apparatus according to claim 1 wherein said code adding means includes means for dividing the line image information into a plurality of data blocks each constructed of a predetermined number of bytes and means for adding an error correcting code to each data block.

3. An image information filing apparatus according to claim 1 wherein said recording means includes: means for differentiating the modulated line data, a laser driver for generating a laser drive signal corresponding to the output signal of said differentiating means, and a laser driven by said laser driver for emitting laser light to the optical disk.

4. An image information filing apparatus according to claim 1 wherein said second code generating means includes means for generating EOL (End Of Line) code and CRC (Cyclic Redundancy Checking) code.

5. An image information filing apparatus according to claim 1 wherein said first code generating means is means for generating a line sync code.

6. An image information filing apparatus comprising:

document information scanning means for scanning a document to produce an image information corresponding to the document pattern;

redundancy processing means for processing the image information every one scanning line to decrease the redundancy of the image information and produce line image information of different lengths;

first code generating means for generating a first special code;

code adding means for adding the first special code to the end of each line image information from the information redundancy processing circuit to produce a line data;

page buffer means for storing line data corresponding to one page;

second code generating means for generating a second special code having components repeated in constant and specific components;

circuit means for reading out sequentially the line data from the page buffer and adding the second special code to each line data;

means for modulating the line data added with the second special code; and optical disk means for recording sequentially the modulated line data on the track of an optical disk, said recording means comprising means for differentiating the modulated line data, a laser driver for generating a laser drive signal corresponding to the output signal of said differentiating means, and a laser driven by said driver for emitting laser light to the optical disk.

7. An image information filing apparatus according to claim 6 wherein said code adding means includes menas for dividing the line image information into a plurality of data blocks each constructed of a predetermined number of bytes and means for adding an error correcting code to each data block.

8. An image information filing apparatus according to claim 6 wherein said second code generating means includes means for generating EOL (End of Line) code and CRC (Cyclic Redundancy Checking) code.

9. An image information filing apparatus according to claim 6 wherein said first code generating means is means for generating a line sync code.

* * * * *